United States Patent
Hammoud et al.

(10) Patent No.: US 7,253,738 B2
(45) Date of Patent: *Aug. 7, 2007

(54) SYSTEM AND METHOD OF DETECTING EYE CLOSURE BASED ON EDGE LINES

(75) Inventors: Riad I. Hammoud, Kokomo, IN (US); Phillip V. Malawey, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 147 days.

This patent is subject to a terminal disclaimer.

(21) Appl. No.: 11/077,041

(22) Filed: Mar. 10, 2005

(65) Prior Publication Data

US 2006/0204041 A1 Sep. 14, 2006

(51) Int. Cl.
*G08B 23/00* (2006.01)
(52) U.S. Cl. ............... 340/575; 340/573.1; 382/107
(58) Field of Classification Search ........... 340/575, 340/573.1, 573; 382/107, 117; 348/77, 348/78; 180/272
See application file for complete search history.

(56) References Cited

U.S. PATENT DOCUMENTS

| | | | |
|---|---|---|---|
| 5,805,720 A | 9/1998 | Suenaga et al. ............ 382/117 |
| 6,717,518 B1* | 4/2004 | Pirim et al. .................. 340/576 |
| 6,928,694 B2* | 8/2005 | Breed et al. ..................... 16/82 |
| 7,043,056 B2* | 5/2006 | Edwards et al. ............ 382/103 |
| 2004/0044293 A1* | 3/2004 | Burton ........................ 600/544 |
| 2005/0073136 A1* | 4/2005 | Larsson et al. ............. 280/735 |

FOREIGN PATENT DOCUMENTS

| | | |
|---|---|---|
| JP | 2004/220080 | 8/2004 |
| WO | 2004/034905 | 4/2004 |

OTHER PUBLICATIONS

EP Search Report dated Aug. 3, 2006.
M. Tistarello; E. Grosso: "Active vision-based face authentication" Image and Vision Computing, 2000, pp. 299-314, XP002390392 *abstract; figure 5* *p. 302, right-hand column*.
"A Drowsy Driver Detection System for Heavy Vehicles" by Richard Grace et al., 0-7803-5086-3/98 © 1998 IEEE, pp. I36-1 through I36-8.
"Drowsy Driver Monitor and Warning System" by Richard Grace, International Driving Symposium on Human Factors in Driver Assessment, Training and Vehicle Design, Aug. 2001, 7 pages.

(Continued)

*Primary Examiner*—Phung T. Nguyen
(74) *Attorney, Agent, or Firm*—Jimmy L. Funke

(57) ABSTRACT

A system and method are provided for monitoring an eye to determine eye closure. The system includes a video imaging camera oriented to generate images of an eye, and a video processor for processing the images. The processor includes an edge detector for detecting edges of the eye in the image, and a line selector for generating a plurality of lines at multiple angles representative of the detected edges. The processor determines the state of eye closure, such as eye open or eye closed, based on the number of lines at selected angles. The system may be employed on a vehicle to determine the eye closure of a driver of the vehicle.

19 Claims, 8 Drawing Sheets

OTHER PUBLICATIONS

"Research On Vehicle-Based Driver Status/Performance Monitoring; Development, Validation, And Refinement Of Algorithms For Detection Of Driver Drowsiness," U.S. Department of Transportation, National Highway Traffic Safety Administration, Dec. 1994.

* cited by examiner

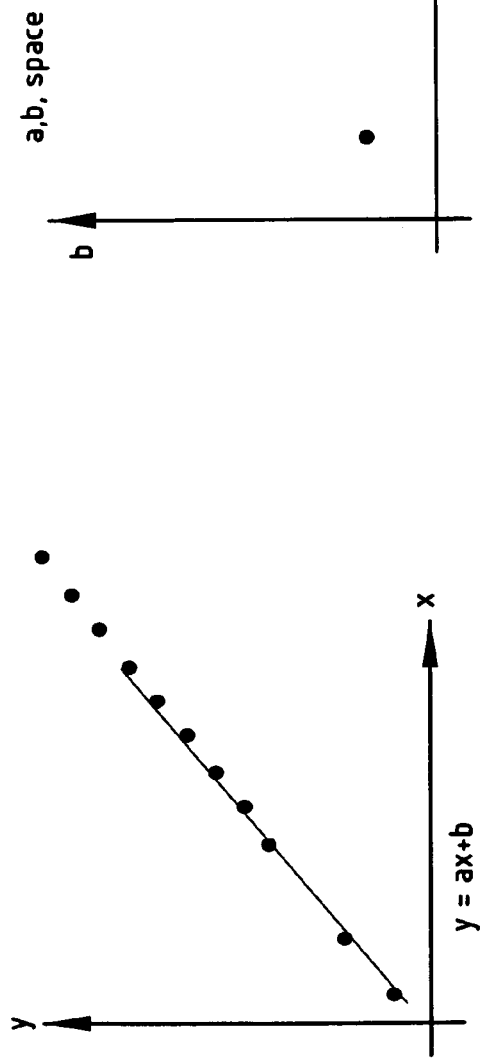
FIG. 8A
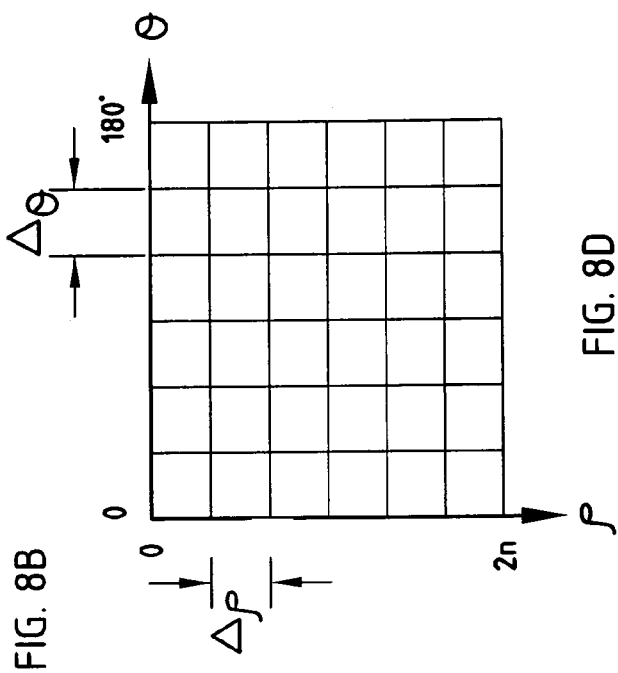
FIG. 8D
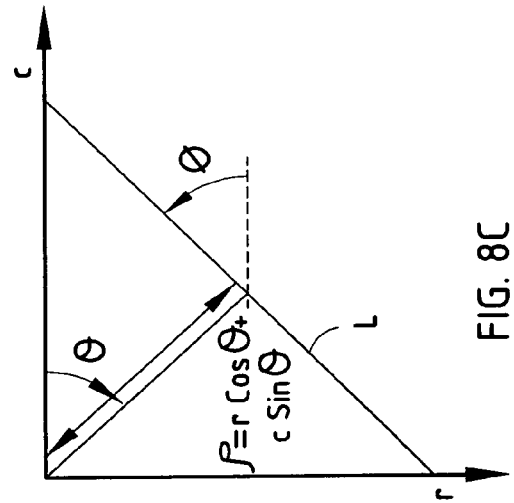
FIG. 8B
FIG. 8C

SYSTEM AND METHOD OF DETECTING EYE CLOSURE BASED ON EDGE LINES

CROSS-REFERENCE TO RELATED APPLICATIONS

This application is one of three applications filed on the same date, all commonly assigned, the other applications being identified as U.S. application Ser. No. 11/077,042, entitled "SYSTEM AND METHOD OF DETERMINING EYE CLOSURE STATE," and U.S. application Ser. No. 11/076,600, entitled "SYSTEM AND METHOD OF DETECTING EYE CLOSURE BASED ON LINE ANGLES," the entire disclosures of which are hereby incorporated herein by reference.

TECHNICAL FIELD

The present invention generally relates to eye monitoring and, more particularly, relates to monitoring an eye, such as one or both eyes of a driver of a vehicle, to determine whether the eye is open or closed.

BACKGROUND OF THE INVENTION

Video imaging systems have been proposed for use in vehicles to monitor a subject person such as the driver and other passengers in the vehicle. Some proposed video imaging systems include one or two cameras focused on the driver of the vehicle to capture images of the driver's face. The video images are processed generally using computer vision and pattern recognition techniques to determine various facial characteristics of the driver including position, orientation, and movement of the driver's eyes, face, and head. Some advanced eye monitoring systems process the captured images to determine eye closure, such as open, half-open (half-closed), and closed states of the eye(s).

By knowing the driver's facial characteristics, vehicle control systems can provide enhanced vehicle functions. For example, a vehicle control system can monitor one or both eyes of the subject driver and determine a condition in which the driver appears to be fatigued or drowsy based on simple statistical analysis of the cumulated results of open or closed state of the eye(s) over time. Standard human factor measures such as PerClos (percentage of eye closure) and AveClos (average of eye closure) could be used to determine the drowsiness state of the driver. For instance, if the AveClos value is determined to be above a certain threshold, the system may initiate countermeasure action(s) to alert the driver of the driver drowsy condition and/or attempt to awaken the driver.

Some proposed vision-based imaging systems that monitor the eye(s) of the driver of a vehicle require infrared (IR) illumination along with visible light filters to control scene brightness levels inside of the vehicle cockpit. One such driver monitoring system produces bright and dark eye conditions that are captured as video images which are processed to determine whether the eye is in the open position or closed position. Such prior known driver eye monitoring systems require specific setup of infrared illuminators on and off the optical camera axis. In addition, these systems are generally expensive, their setup in a vehicle is not practical, and they may be ineffective when used in variable lighting conditions, especially in bright sunny conditions. Further, variations in eyelash contrast and eye iris darkness levels for different subject persons may cause such prior systems to make erroneous eye state discrimination decisions.

It is therefore desirable to provide for a cost affordable and effective method for monitoring an eye and determining the eye closure state. In particular, it is desirable to provide for an eye monitoring system for discerning the open and closed states of the eye(s) of a driver of a vehicle that overcomes drawbacks of prior known proposed eye monitoring approaches.

SUMMARY OF THE INVENTION

In accordance with the teachings of the present invention, a system and method are provided for monitoring an eye and determining eye closure. According to one aspect of the present invention, the system includes a video imaging camera oriented to generate images of an eye. The system further includes a processor for processing the images generated with the video imaging camera. The processor includes an edge detector for detecting edges of the eye in the image and a line selector for generating a plurality of lines representative of the detected edges at multiple selected angles. The processor determines a state of eye closure based on the number of the lines at selected angles.

According to another aspect of the present invention, the method includes the steps of arranging a video imaging camera to generate images of an eye, and generating an image of the eye. The method also includes the steps of processing the image to identify edges of the eye in the image, and generating a plurality of lines representative of the edges at multiple selected angles. The method further includes the step of determining an eye closure state based on the number of the lines at selected angles.

Accordingly, the system and method according to the present invention effectively determines the closure state of the eye, such as an open eye state or closed eye state, with a cost affordable and real-time eye monitoring system. The eye monitoring system is particularly useful in a vehicle for monitoring the eye(s) of a driver of the vehicle and determining if the driver's eye(s) are substantially closed (i.e., closed or almost closed).

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIGS. 8A-8D illustrate the standard Hough Transformation for straight line detection, illustrating edge pixels plotted in Cartesian coordinates in FIG. 8A, transformed to (a, b) space in FIG. 8B, transformed to polar space in FIG. 8C, and lines mapped in a lookup table in FIG. 8D.

DESCRIPTION OF THE PREFERRED EMBODIMENT

Figure 1:
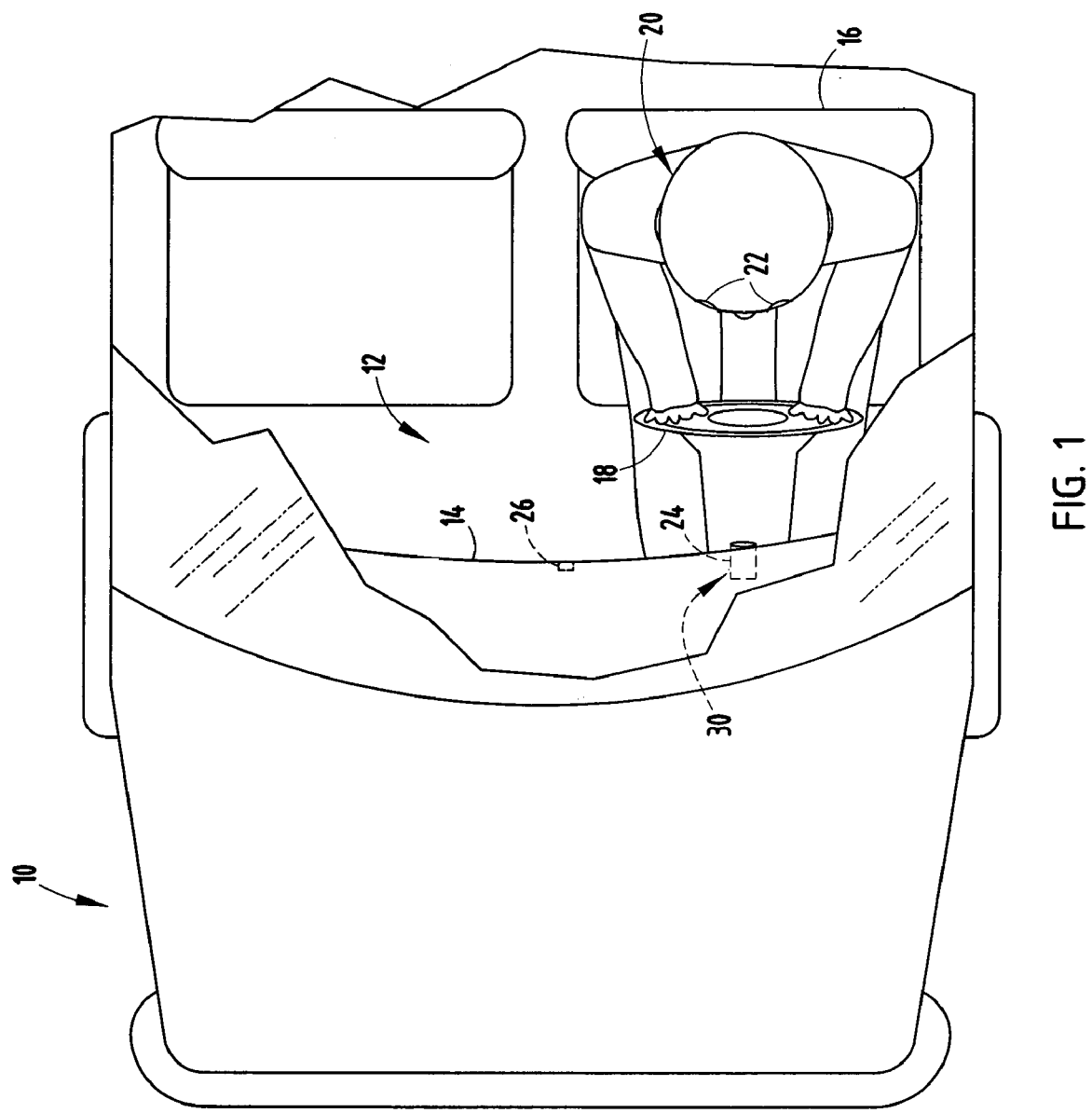
FIG. 1 is a top view of the cockpit of a vehicle equipped with an eye monitoring system for monitoring the eye(s) of a driver.

Referring now to FIG. 1, the passenger compartment (cockpit) 12 of a vehicle 10 is generally shown equipped with a driver eye monitoring system 30. The eye monitoring system 30 has a video imaging camera 24 oriented and focused on a subject person (driver) 20 driving the vehicle 10 for capturing and generating video images of the driver 20. The eye monitoring system 30 monitors one or both eyes of the person 20 and determines binary eye closure, e.g., open eye state or closed eye state.

The video imaging camera 24 is shown located generally in front of the driver's seat 16 in the front region of the vehicle cockpit 12. According to one embodiment, video imaging camera 24 is mounted in the instrument cluster. However, the camera 24 may be mounted in other locations onboard the vehicle 10 which allow for acquisition of video images capturing one or both eyes of the driver 20 of the vehicle 10. For example, the video imaging camera 20 may be mounted in the steering assembly 18 or mounted in the dash 14. While a single video imaging camera 24 is shown and described herein, it should be appreciated that two or more video imaging cameras may be employed in the eye monitoring system 30, without departing from the teachings of the present invention.

The video imaging camera 24 is arranged so as to capture successive video image frames of the region where the face of the driver 20 of the vehicle 10 is expected to be located during normal vehicle driving. More particularly, the acquired video image captures the driver's face including one or both eyes 22 and the surrounding ocular features generally found in the area referred to as the ocular adnexa. These features may include one or both eyes 22 and the pupil of the eyes 22, the upper (superior) and lower (inferior) eyelids, and the palpebral fissure space between the eyelids. The acquired video images are then processed to determine characteristics of one or both eyes 22 of the subject person (driver) 20. Each video frame image is processed to determine the eye closure state of one or both eyes 22 of the driver 20, such as open eye position or closed eye position states. By knowing the eye closure state, the eye monitoring system 30 allows for determination of a driver drowsiness condition or inattentive driver condition, among other uses.

The eye monitoring system 20 is also shown employing an optional light illuminator 26 located forward of the driver 20, such as in the dash 14, for illuminating the face of the driver 20. The light illuminator 26 may include one or more infrared (IR) light emitting diodes (LEDs). Either on-axis or off-axis LEDs may be employed (e.g., no specific IR setup is required, in particular). The light illuminator 26 may be located anywhere onboard the vehicle 10 sufficient to supply any necessary light illumination to enable the camera 24 to acquire video images of the driver's eye(s) 22.

Figure 2:
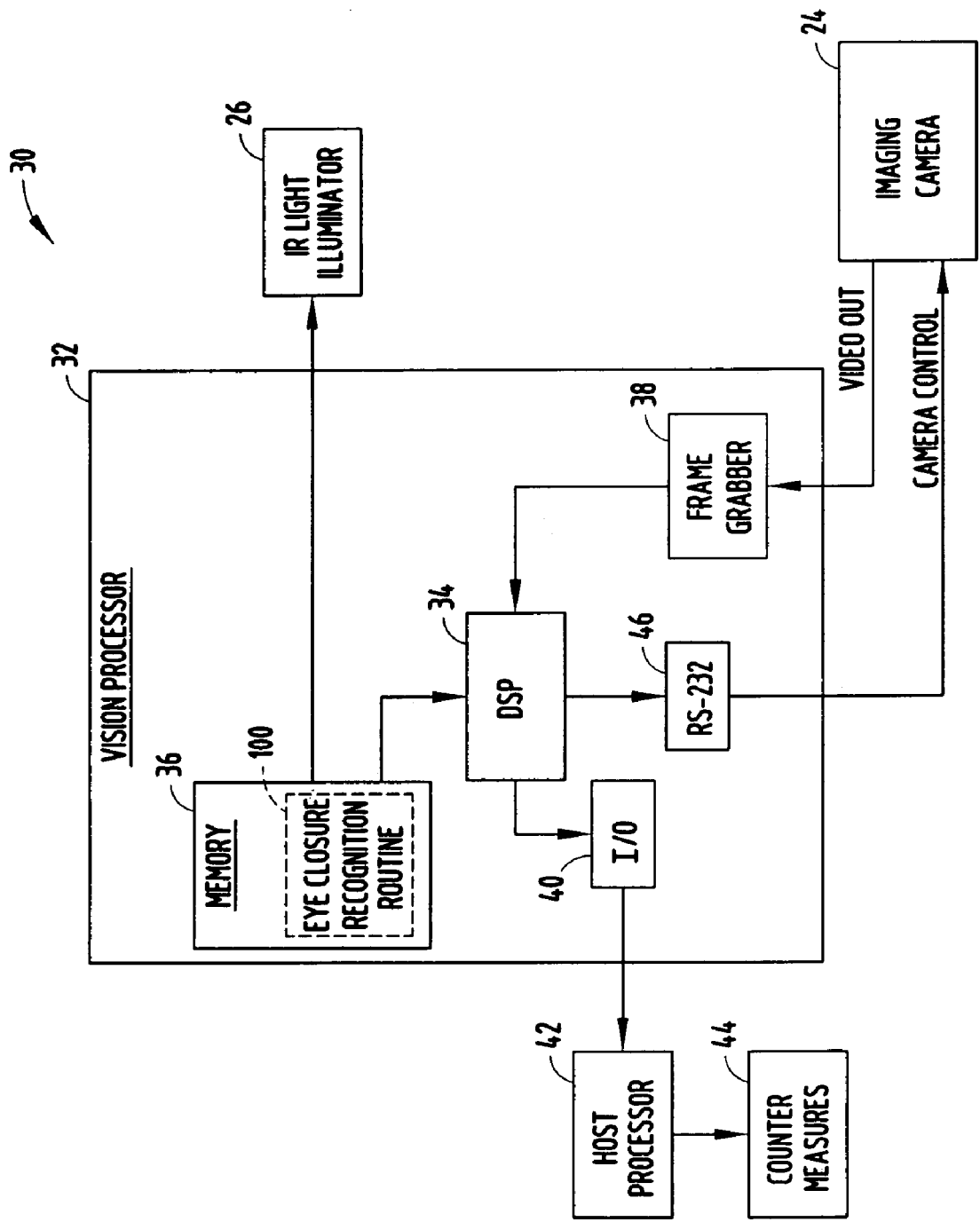
FIG. 2 is a block diagram illustrating the eye monitoring system according to the present invention.

Referring to FIG. 2, the eye monitoring system 30 is shown having the video imaging camera 24 and IR light illuminator 26 coupled to a vision processor 32 which, in turn, is coupled to a host processor 42. The video imaging camera 24 may include a CCD/CMOS active-pixel digital image sensor mounted as a chip onto a circuit board. One example of a CMOS active-pixel digital image sensor is Model No. PB-0330, commercially available from Photobit, which has a resolution of 640 H×480 V. It should be appreciated that other imaging cameras may be employed.

The vision (video) processor 32 is shown having a frame grabber 38 for receiving the video output frames generated by the video imaging camera 24. Vision processor 32 also includes a digital signal processor (DSP) 34 for processing the acquired video image frames. The digital signal processor 34 may include a fixed point processor, such as Model No. C6416 commercially available from Texas Instruments. A fixed point processor can perform fixed point trigonometric functions and/or use lookup tables. Alternately, the digital signal processor may include a floating point processor.

The vision processor 32 further includes memory 36, such as random access memory (RAM), read-only memory (ROM), and other memory, as should be readily apparent to those skilled in the art. The vision processor 32 is configured to perform one or more routines for controlling activation of the IR light illuminator 26, controlling the video imaging camera 24, processing the acquired video images to determine eye closure state, and applying the processed information to vehicle control systems, such as host processor 42.

The vision processor 32 may provide camera control functions via control RS-232 logic 46 which allows for control of the video imaging camera 24 via camera control signals. Control of the video imaging camera 24 may include automatic adjustment of the pointing orientation of the video imaging camera 24. For example, the video imaging camera 24 may be repositioned to focus on an identifiable feature, and may scan a region in search of an identifiable feature, including the driver's face and, more particularly, one or both eyes 22. Camera control may also include adjustment of focus and magnification as may be necessary to track an identifiable feature. Thus, the eye monitoring system 30 may automatically locate and track one or more identifiable features, such as one or both of the driver's eyes 22.

The eye monitoring system 30 includes an eye closure recognition routine 100 stored in memory 36 and processed by the digital signal processor 34. Routine 100 may be implemented as a software program as should be evident to those in the art. The eye closure recognition routine 100 processes the captured video images of the eye 22 to determine the eye closure state (e.g., eye open position or eye closed position states).

Figure 3:
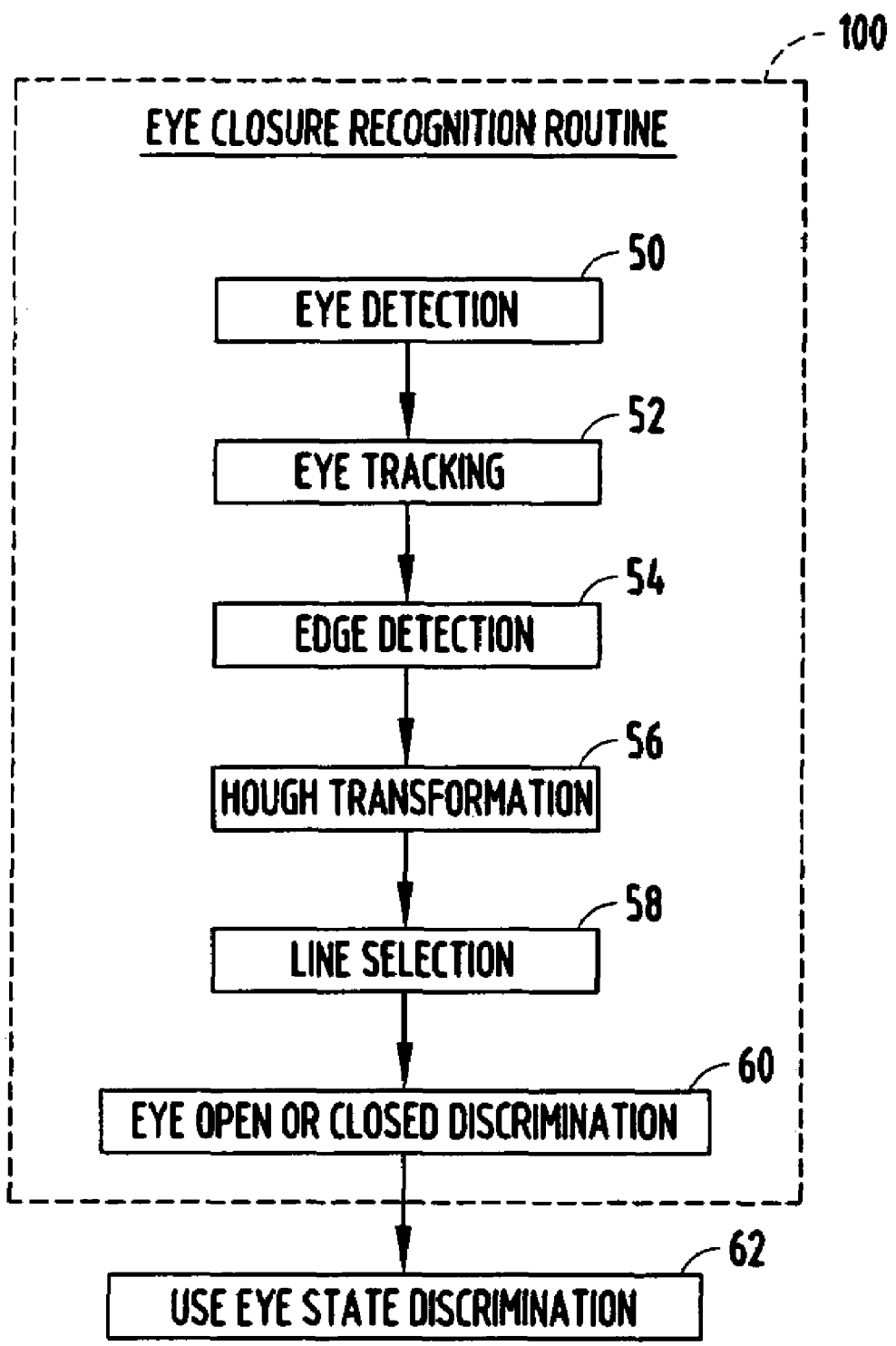
FIG. 3 is a block diagram illustrating functions performed by the eye closure recognition routine.

Referring to FIG. 3, the eye closure recognition routine 100 performs various functions including eye detection function 50 which detects one or both eyes, and eye tracking function 52 which tracks one or both detected eyes in the captured video images. Routine 100 also includes an edge detection function 54 for detecting edge boundaries of the eye in the captured image. Routine 100 performs a Hough Transformation function 56 to transform plotted edge pixel points from Cartesian coordinates to polar coordinates (space) to enable the generation of lines on the edge boundaries of the monitored eye 22. Routine 100 further includes a line selection function 58 for generating and selecting multiple lines that represent the edge boundaries of the eye 22. The multiple lines may be selected from clustered groupings and may be present at any of a plurality of select angles.

Eye closure routine 100 performs an eye open or closed discrimination function 64. The eye open or closed discrimination function 64 determines the state of eye closure. The eye closure determination is achieved by monitoring the edge boundaries of the monitored eye 22 and determining if there are one or zero lines at all select angles such that the eye 22 is substantially closed. If there are multiple lines at any of the select angles, then the eye 22 is determined to be in the open state. The determined eye closure state may be employed in any of a number of applications in function block 62.

Referring back to FIG. 2, the determined eye closure state is made available to the host processor 42 via input/output (I/O) 40. The host processor 42 may include any of a number of control devices that may employ the determined eye closure state for use in any of a number of applications. For example, the determined eye closure state may be used in a driver drowsy application or other application(s) to initiate countermeasures 44. Examples of countermeasures 44 may include activating an audible warning, initiating a haptic seat, increasing vehicle following distance, initiating cold air conditioning (A/C), and/or activating peppermint olfactory stimulation.

Figure 4B:
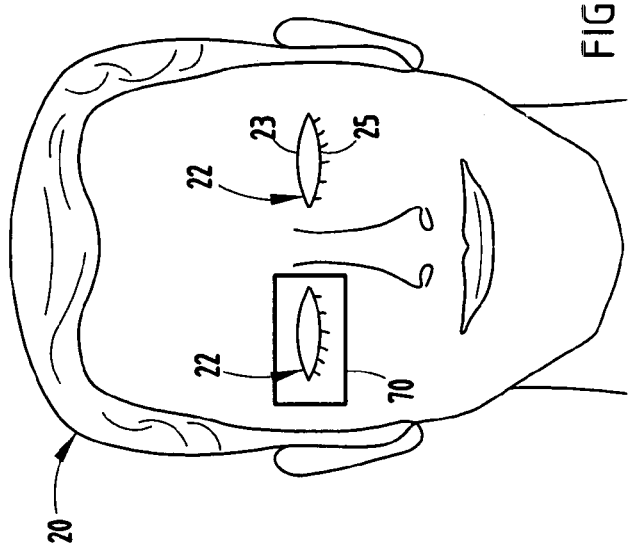
FIG. 4B is a pictorial representation of a video image captured by the camera showing closed eyes of the driver.
Figure 4A:
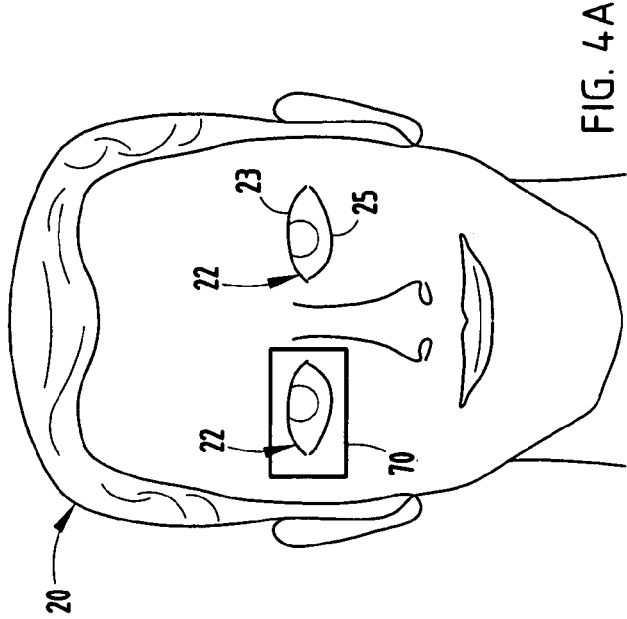
FIG. 4A is a pictorial representation of a video image captured by the camera showing open eyes of the driver.

Referring to FIGS. 4A and 4B, representative video images generated with video imaging camera 24 capturing the driver's face 20 are shown, according to one example. One video image frame showing the eyes 22 in the open state is shown in FIG. 4A. Another video image frame showing the eyes 22 in the closed state is shown in FIG. 4B.

The eye closure recognition routine 100 detects an eye 22 and tracks a region shown bounded by an eye tracking window 70 generally centered about the eye 22. The eye tracking window 70 may include a rectangular sub-image having a size of 88×40 pixels, according to one example. The eye tracking window 70 may be of any shape and is of sufficient size to capture a region greater than the upper and lower edge boundaries of the monitored eye 22.

The monitored eye 22 is shown within eye tracking window 70 having an upper eyelid 23 generally defining the upper edge boundary of eye 22 and a lower eyelid 25 generally defining the lower edge boundary of eye 22. The eye closure recognition routine 100 generates a plurality of lines on the edge boundary that may exist at multiple select angles, and further determines the eye closure state based on the number of lines at the select angles.

Figure 5B:
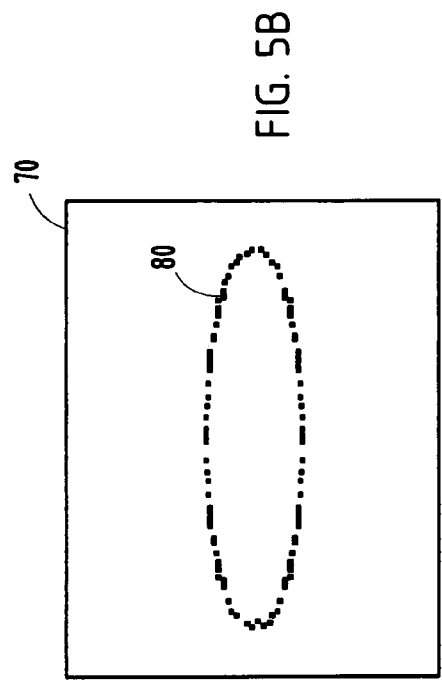
FIG. 5B is a gray-scale exploded view of the edge boundaries of the eye as captured in the image of FIG. 4B.
Figure 5A:
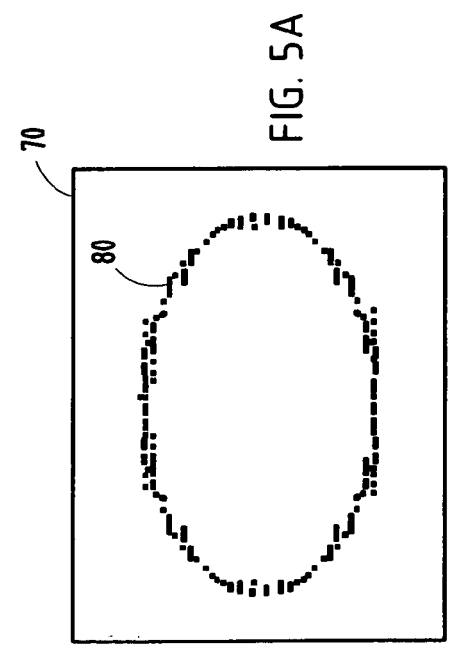
FIG. 5A is a gray-scale exploded view of the edge boundaries of the eye as captured in the image of FIG. 4A.

The eye closure recognition routine 100 generates a gray-scale video image within eye tracking window 70, detects the boundary edges 80 of the eye 22, generates a plurality of lines representing the edges 80 at multiple select angles, selects permanent lines from any close groupings (clusters), and determines eye closure based on the number of lines present at the select angles. The edge boundaries 80 of the eye 22 are shown in FIGS. 5A and 5B as a gray-scale image in which the pixels at the boundary edges 80 exhibit a characteristic shading (e.g., dark gray contrasted with white, or vice versa) that identifies the boundary edges 80 of the eye 22. The edge map (set of edge pixels) is computed using a standard edge detector (e.g., Sobel edge detector). The eye closure recognition routine 100 plots the pixels exhibiting the characteristic gray-scale boundary edges 80 in Cartesian coordinates and transforms the Cartesian coordinates to a polar space via a Hough Transformation.

Figure 6A:
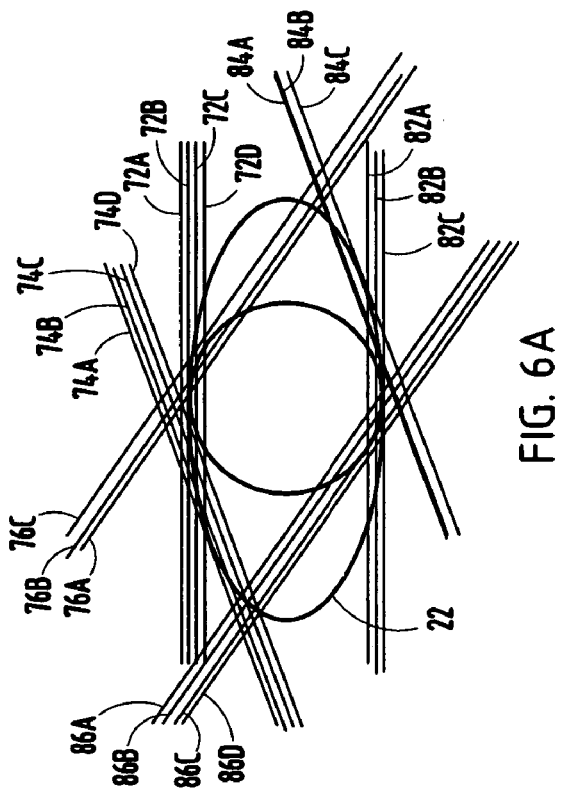
FIG. 6A is a schematic diagram illustrating the generation of lines at multiple angles on the eye edge boundary for an open eye state.
Figure 6B:
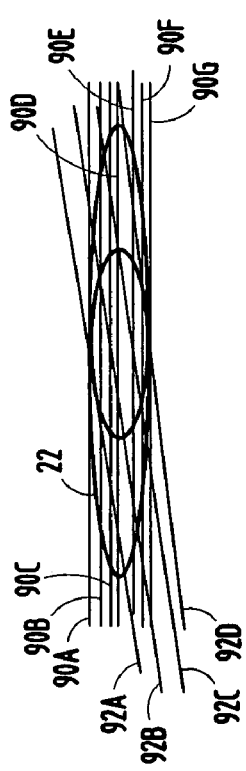
FIG. 6B is a schematic diagram illustrating the generation of lines on the eye edge boundary for a substantially closed eye state.

From the Hough Transformation, a plurality of lines are extracted and, from the plurality of lines, the most permanent lines of each of any clustered groupings are selected according to one embodiment. Examples of a plurality of lines generally defining the boundary edges 80 of the eye 22 are illustrated in FIGS. 6A and 6B for an open eye state and a closed eye state, respectively. At several select angles φ, lines are generated at the boundary edges 80. In the example shown in FIG. 6A, the lines include lines 72A–72D and 82A–82C are generated on upper and lower boundary edges, respectively, of eye 22 at the angle φ=about zero degrees (0°), which are horizontal. Similarly, lines 74A–74D and 84A–84C generated on opposite sides of eye 22 parallel to each other, but oriented at the same approximate angle φ of about thirty degrees (30°). Further, lines 76A–76C and 86A–86D are generated on opposite boundary edges of eye 22 at an angle φ of about minus thirty degrees (−30°).

Figure 7A:
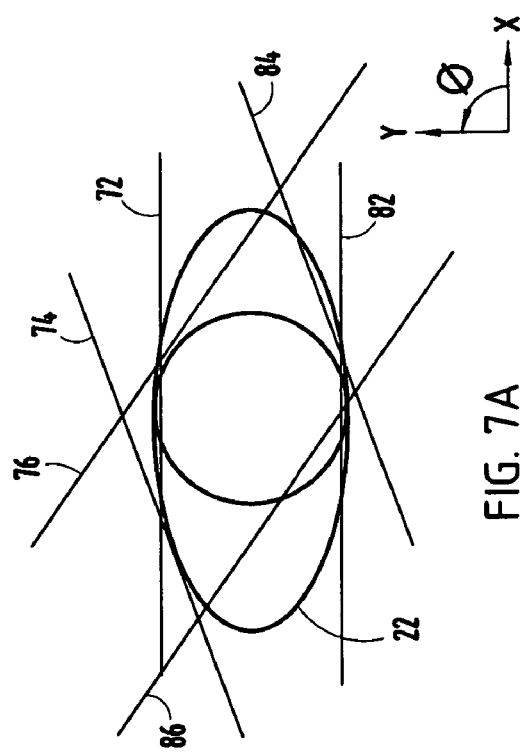
FIG. 7A is a schematic diagram illustrating multiple lines present at selected angles during an open eye state as shown in FIG. 6A.

Certain of the plurality of lines shown in FIG. 6A are close together so as to form a clustered grouping of lines. Lines within a certain distance Y pixels, such as Y=eight pixels, according to one example, may be grouped into one cluster to generate a single line representative of the group. The representative line for each group may be chosen as shown in FIG. 7A. In this embodiment, the most dense (strongest) line identifying the boundary at a given angle φ is chosen for each clustered grouping. According to another embodiment, an average line may be selected as the representative line for each clustered grouping.

When the eye 22 is open as shown in FIGS. 6A and 7A, there are a plurality of selected lines present at certain angles. In the example shown in FIG. 7A, a pair of lines 72 and 82 are present at the angle φ=zero degrees (0°), a second pair of lines 74 and 84 are present at the angle φ=thirty degrees (30°), and a third pair of lines 76 and 86 are present at the angle θ=minus thirty degrees (−30°). In the example given, the presence of more than one line at any of the select angles φ=zero degrees (0°), thirty degrees (30°), and minus thirty degrees (−30°) is indicative of the eye being in the open position state. In other examples, the select angles θ may include any of a plurality of angles.

Figure 7B:
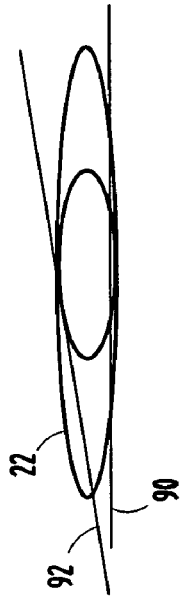
FIG. 7B is a schematic diagram illustrating eye closure recognition when multiple lines are not present at any selected angle during a closed eye state as shown in FIG. 6B.

In FIG. 6B, lines 90A–90G are generated along the boundary edges 80 of eye 22 at an angle φ=zero degrees (0°) when the eye 22 is in the closed position. Each of the lines 90A–90G are sufficiently close together (within Y pixels) to form a single grouping (cluster) such that a single representative line 90 is selected from the clustered grouping as shown in FIG. 7B. Similarly, a plurality of lines 92A–92D are generated at the boundary edges 80 of eye 22 along an angle φ=fifteen degrees (15°). Lines 92A–92D are sufficient close to generate a single line 92 representative of the clustered grouping in FIG. 7B. At any of the select angles φ shown in FIG. 7B, there is only a single line, line 90 or 92, at any given angle φ. Since there is no more than one line present at any select angle φ shown in FIG. 7B, the eye 22 is determined to be in the closed position state.

In the above examples shown in FIGS. 6A, 6B, 7A and 7B, lines are generated at a plurality of select angles φ=zero degrees (0°), fifteen degrees (15°), thirty degrees (30°), and minus thirty degrees (−30°), along the boundary edges 80 of the eye 22. It should be appreciated that any of a number of select angles may be used to generate the edge lines. For example, select angles φ may be set equal to zero degrees (0°), twenty degrees (20°), forty degrees (40°), sixty degrees (60°) and minus ten degrees (−10°) according to another example. According to a further example, seven equally spaced angles may be chosen ranging from minus forty-five degrees (−45°) to forty-five degrees (45°) for the select angles φ. Any of a number of select angles may be employed, depending upon the resolution of the processed image and the processing capability. It should also be appreciated that the select angles φ may be chosen to include lines at edge boundaries within ±X degrees, in which X is an acceptable angular deviation from the select angle φ. X may include seven degrees (7°), according to one embodiment.

The use of the Hough Transformation to generate linear lines and to enable selection of representative lines is illustrated in FIGS. 8A-8D. The Hough Transformation transforms two-dimensional images with lines into a domain of possible linear parameters, where each line in the image provides a peak position at the corresponding line parameters. In the Hough Transformation, the angle φ=90°−θ or θ=90°−φ. The Hough Transformation is generally known in the art of image processing and computer vision for detecting shapes and, in particular, straight lines. While a Hough Transformation is described herein in connection with the present invention, it should be appreciated that other transformations such as a Radon Transformation, or Least-square type methods for line fitting may be employed to generate the plurality of lines.

In FIG. 8A, the video image pixels that identify an edge boundary 80 of the eye 22 are plotted in a Cartesian coordinate as a function of the X- and Y-axes. By way of the Hough Transformation, the Cartesian coordinates are converted to an (a, b) space as seen FIG. 8B and a polar space as shown in FIG. 8C. The polar space plots lines of interest (L) as a function of r, c and θ. The distance ρ from a reference point is generated as a function of r, c and θ according to the following equation: ρ=r Cos θ+c Sin θ. Angle θ is defined as 90°−φ, Accordingly, a line of interest L, is defined by ρ and θ.

A lookup table is then created as seen in FIG. 8D. Each cell of the lookup table represents the number of edge boundary pixels of a line (ρ, θ). θ ranges from zero degrees (0°) to one hundred eighty degrees (180°), and each cell includes a dimension size of $\Delta_\theta$. ρ ranges from 0 to 2n, and has a cell dimension size of $\Delta_\rho$. Parameter n is the largest dimension of the image (i.e., width or height). The Hough Transformation provides a polar space which defines the desired increments of ρ and θ, $\Delta_{92}$ and $\Delta_\theta$, and quantifies this space accordingly.

For every point of interest (typically points found by edge detectors that exceeds some threshold value), values for r and c are plugged into the line equation and, for each value of θ in the quantified space, the distance ρ is solved for. For each ρ, θ pair, the rc pair in the corresponding block in the quantified space is recorded which constitutes a hit for a particular block. The number of hits in each block corresponds to the number of pixels on the line as defined by the values of ρ and θ in that block. A minimum threshold is chosen as one-third of the tracking window 70 width (e.g., in the example given the width is equal to eighty-eight (88) pixels so the threshold is about twenty-nine (29) pixels) is used to select a set of lines from the lookup table.

From the Hough Transformation, representative lines are chosen by extracting the coordinates of distance ρ at multiple angles θ that meet the minimum threshold requirement. The desired increments of ρ and θ, $\Delta_\rho$ and $\Delta_\theta$, are defined in the space as quantified. The lines are sorted based on the number of adjacent lines and a quantity of lines within a predetermined range. Each set of multiple lines within the sorted array is fused together to form a single representative line if they meet the threshold criteria for adjacency and quantity. The lines may be selected at multiple angles θ=select values±X degrees, which X is an acceptable angular deviation from the angle θ to allow for the inclusion of close lines. X may include seven degrees (7°), according to one embodiment. The multiple lines represent the edge boundaries of the eye at various angle θ.

To discriminate the eye closure states, including open eye and closed eye positions, the plurality of lines at the plurality of select angles θ are evaluated. If more than one line exists at any one of the select angles θ, the eye 22 is determined to be in the open position state. If there is no more than one line present at each of select angles θ, then the eye 22 is determined to be in the closed position state.

Figure 9A:
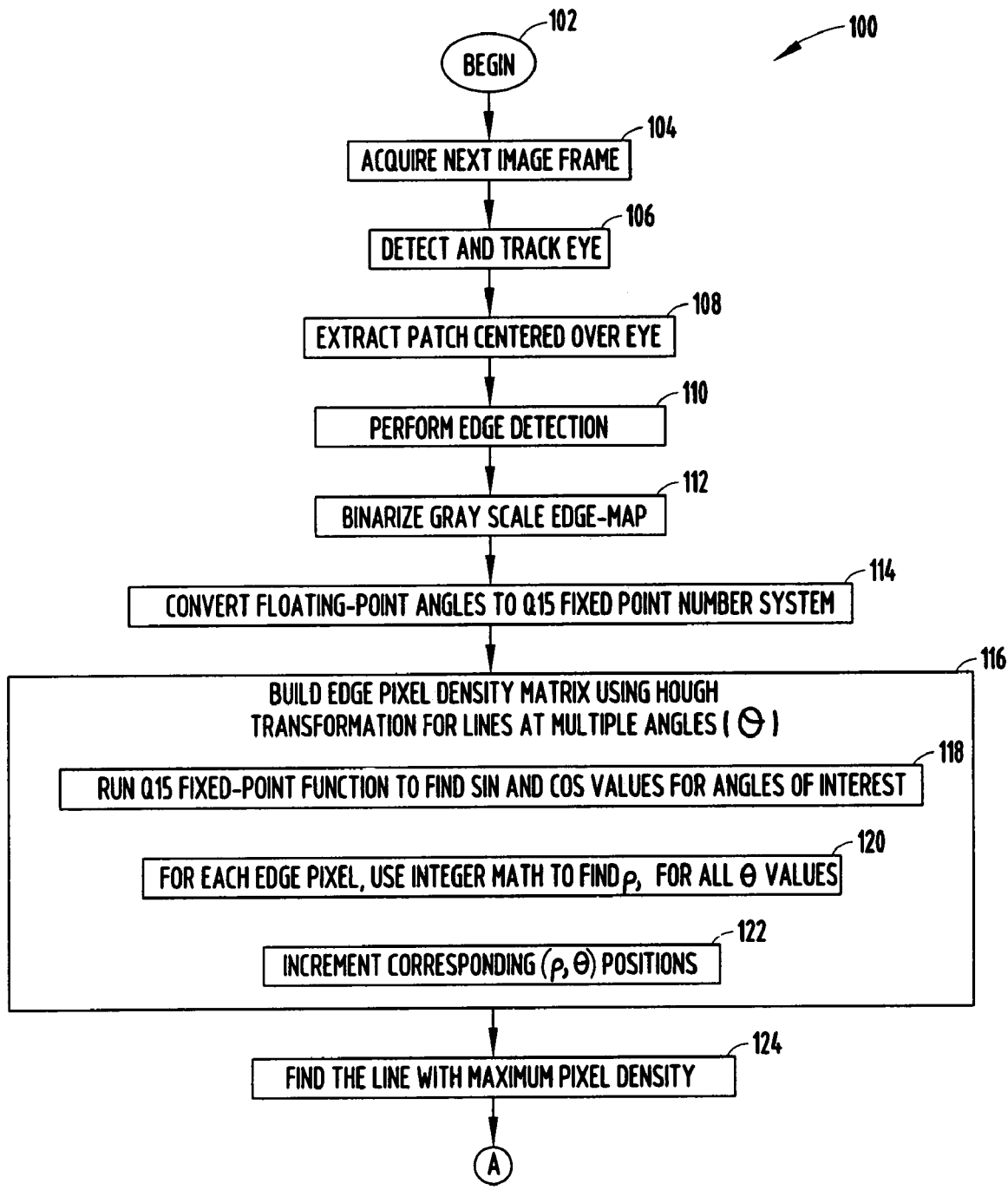
FIGS. 9A and 9B is a flow diagram illustrating the eye closure recognition routine for determining the eye closure state according to the present invention.
Figure 9B:
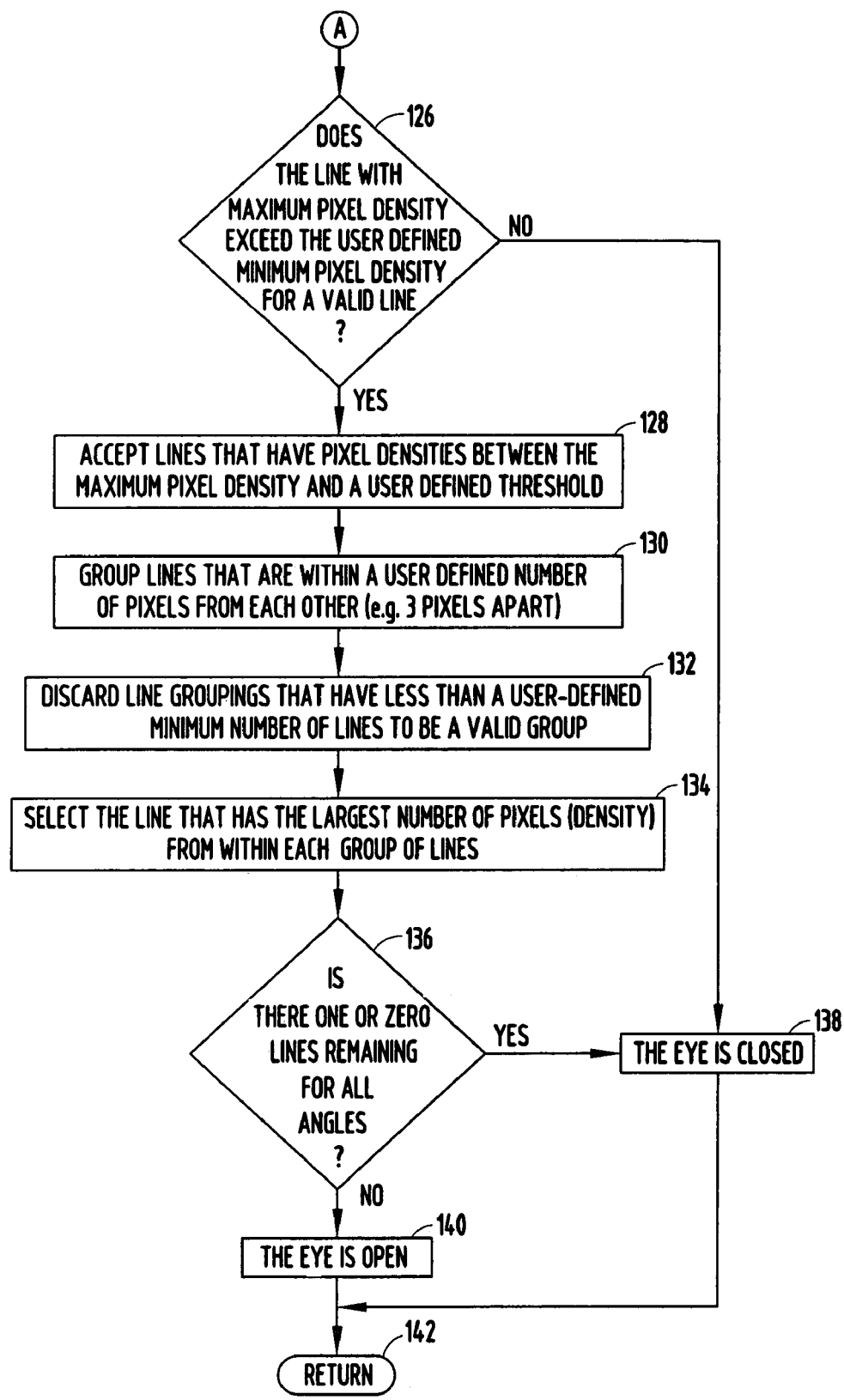

The eye closure recognition routine 100 is shown in detail in FIGS. 9A through 9C. Routine 100 begins at step 102 and proceeds to step 104 to acquire the next video image frame generated by the video imaging camera. Routine 100 begins to process the acquired video image frame including detecting and tracking the subject eye in step 106. The eye detection and tracking functions may employ the use of known image pattern recognition techniques.

Proceeding to step 108, routine 100 extracts a patch as the eye tracking window centered over the subject eye. Routine 100 then performs edge detection in step 110 to determine the edge boundaries of the monitored eye, including the edges of the upper and lower eyelids. The edge detection may include the use of known edge detection software, such as a Sobel edge detector.

Eye closure recognition routine 100 binarizes a gray-scale edge-map in step 112 to provide gray-scale shading for the individual video image pixels. Certain pixels will exhibit a characteristic gray-scale image to identify the edge boundaries in the video image. In the embodiment shown, eye closure recognition routine 100 converts floating-point angles to a fixed-point number system, such as the Q15 fixed-point number system, in step 114. By converting floating-point angles to a fixed point number system, the fixed point digital signal processor is able to process the data. It should be appreciated that a floating point processor could alternately be employed.

Routine 100 then builds an edge pixel density matrix using the Hough Transformation and processes the plurality of lines at multiple select angles θ in step 116. The lines present at each of the select angles θ are stored, such as mapped in a lookup table, so that the number of representative edge lines present at each angle θ may be determined.

As part of the Hough Transformation, routine 100 runs a Q15 fixed-point function to find the Sin and Cos values for each of the select angles θ of interest in step 118. The angles θ of interest may include a select number of angles at incremental angular spacings. For example, the angles of interest may include angles at ninety degrees (90°), seventy degrees (70°), fifty degrees (50°), thirty degrees (30°) and one hundred degrees (100°) according to one example. Other select angles θ may be chosen to include an angular deviation of ±X degrees.

Once the Sin and Cos values are found for each of the select angles θ of interest, eye closure recognition routine 100 proceeds to step 120 to use integer math to find distance ρ for all angle θ values for each edge pixel as part of the Hough Transformation. In step 122, the corresponding pairs of ρ and θ positions are incremented further as part of the Hough Transformation.

Following the Hough Transformation, routine 100 proceeds to step 124 to find the line with the maximum pixel density. Eye closure recognition routine 100 then proceeds to decision step 126 to decide if the line with the maximum pixel density exceeds the user defined minimum pixel density for a valid line and, if not, determines that the eye is closed in step 138 before returning in step 142. If the line with the maximum pixel density does not exceed a user defined minimum pixel density for a valid line, then routine 100 assumes that there are no valid lines and makes a decision that the eye is in the closed position state. Contrarily, if the line with the maximum pixel density exceeds the user defined minimum pixel density for a valid line, routine 100 proceeds to step 128 to accept those lines that have pixel densities between the maximum pixel density and a user defined threshold. An example of a user defined threshold may be defined by (maximum pixel density)*2/3 (e.g., 29*2/3)=19.

Lines that are within a user defined number of pixels from each other, such as three pixels apart, are grouped in step 130. Those clustered groupings that have less than a user defined minimum number of lines to be a valid group are discarded in step 132. Next, in step 134, routine 100 selects the line that has the largest number of pixels (density) from within each clustered group of lines.

Proceeding to decision step 136, eye closure recognition routine 100 checks for whether there is one or zero lines remaining for all select angles θ of interest. If there is one or zero lines remaining for all select angles θ of interest, routine 100 determines that the eye is in the closed position in step 138 before returning in step 142. If it is determined that there is more than one line remaining for any single select angle θ of interest, routine 100 proceeds to determine that the eye is in the open position state in step 140 before returning in step 142. Accordingly, for any of the select angles θ of interest, if more than two lines are present, routine 100 determines that the eye is in the open position.

The eye closure recognition routine 100 is therefore able to discriminate whether the eye 22 is in an open state or closed state based on the number of lines present at the selected angles θ. Further, it should be appreciated that the eye closure recognition routine 100 may determine that the eye state is closed when no boundary edges or no lines are found in the processed video frame image. Similarly, if only one line is identified, the eye closure recognition routine 100 may conclude that the eye state is closed.

The eye monitoring system 30 employs the eye closure recognition routine 100 to discriminate the closure state of a monitored subject eye 22 by comparing multiple lines at various select angles θ and determining an amount of eye closure based on the number of lines present at the selected angles θ. In order to be at the same angle θ, the lines are substantially linear and substantially parallel to each other, according to the embodiments shown and described herein. However, it is conceivable that the eye monitoring system 30 may generate non-linear lines and determine eye closure state based on the non-linear lines, without departing from the teachings of the present invention. It should be appreciated that the lines may extend at angles slightly offset from one another in order to be at the same angle.

Accordingly, the eye monitoring system 30 of the present invention advantageously captures and processes images of the eye 22 to determine eye closure. The eye monitoring system 30 is economical and easy to manufacture and deploy in a vehicle 10. It should be appreciated that the eye monitoring system 30 may be employed in various applications employed both on and off a vehicle.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A system for monitoring an eye and determining eye closure, said system comprising:
   a video imaging camera oriented to generate images of an eye; and
   a video processor for processing the images generated with the video imaging camera, said video processor comprising an edge detector for detecting edges of the eye in the image and a line selector for selecting a plurality of lines representative of the detected edges at multiple selected angles, said processor determining a state of eye closure based on the number of said lines at selected angles.

2. The system as defined in claim 1, wherein said plurality of lines are substantially linear.

3. The system as defined in claim 1, wherein said processor determines the state of eye closure based on the number of said lines at each of a plurality of the selected angles.

4. The system as defined in claim 1, wherein said processor further determines the number of lines at each of a plurality of selected angles, and determines a state of eye closure based on the number of said lines at each of the plurality of selected angles.

5. The system as defined in claim 1, wherein said processor performs a Hough Transformation to transform the plurality of lines from Cartesian coordinates to polar space and further determines the number of lines at each of the multiple selected angles.

6. The system as defined in claim 1, wherein said detected edges comprise a gray-scale representation of pixels imaging the eye.

7. The system as defined in claim 1, wherein the system is employed in a vehicle for monitoring an eye of a driver of the vehicle.

8. A vehicle eye monitoring system for monitoring an eye of a person in a vehicle and determining eye closure, said system comprising:
   a video imaging camera located on a vehicle and oriented to generate images of an eye of a person in the vehicle; and
   a video processor for processing the images generated with the video imaging camera, said video processor comprising an edge detector for detecting edges of the eye in the image and a line selector for selecting a plurality of lines representative of the detected edges at multiple angles, said processor determining a state of eye closure based on the number of said lines at selected angles.

9. The system as defined in claim 8, wherein said plurality of lines are substantially linear.

10. The system as defined in claim 8, wherein said processor determines the state of eye closure based on the number of said lines at each of a plurality of the selected angles.

11. The system as defined in claim 8, wherein said processor further determines the number of lines at each of a plurality of selected angles, and determines a state of eye closure based on the number of said lines at each of the plurality of selected angles.

12. The system as defined in claim 8, wherein said line selector comprises a Hough Transformation for transforming the plurality of lines from Cartesian coordinates to polar space and further determines the number of lines at each of the multiple selected angles.

13. The system as defined in claim 8, wherein said detected edges comprise a gray-scale representation of pixels imaging the eye.

14. A method of monitoring an eye and determining eye closure, said method comprising the steps of:
   arranging a video imaging camera to generate images of an eye;
   generating an image of the eye;
   processing the image to identify edges of the eye in the image;
   generating a plurality of lines representative of the edges at multiple selected angles; and
   determining an eye closure state based on the number of said lines at selected angles.

15. The method as defined in claim 14, wherein the step of generating a plurality of lines comprises generating a plurality of lines that are substantially linear.

16. The method as defined in claim 14, wherein the step of determine an eye closure state comprises determining the eye closure state based on the number of said lines at each of a plurality of the selected angles.

17. The method as defined in claim 14 further comprising the step of generating the number of lines at each of the multiple selected angles and determining an eye closure state based on the number of lines at each of the plurality of selected angles.

18. The method as defined in claim 14, wherein the step of generating a plurality of lines comprises transforming said plurality of lines from Cartesian coordinates to polar space with a Hough Transformation and determining the number of lines at each of the multiple selected angles.

19. The method as defined in claim 14, wherein said step of arranging a video imaging camera comprises arranging the video imaging camera in a vehicle to monitor the eye of the driver of the vehicle.

\* \* \* \* \*